J. W. AND E. A. TYGARD.
GRADUALLY VARIABLE POWER TRANSMISSION GEAR OR DRIVE.
APPLICATION FILED NOV. 29, 1921.

1,428,999.

Patented Sept. 12, 1922.
2 SHEETS—SHEET 1.

Inventors
J. W. and E. A. Tygard,
By Markel Clerk
Attys.

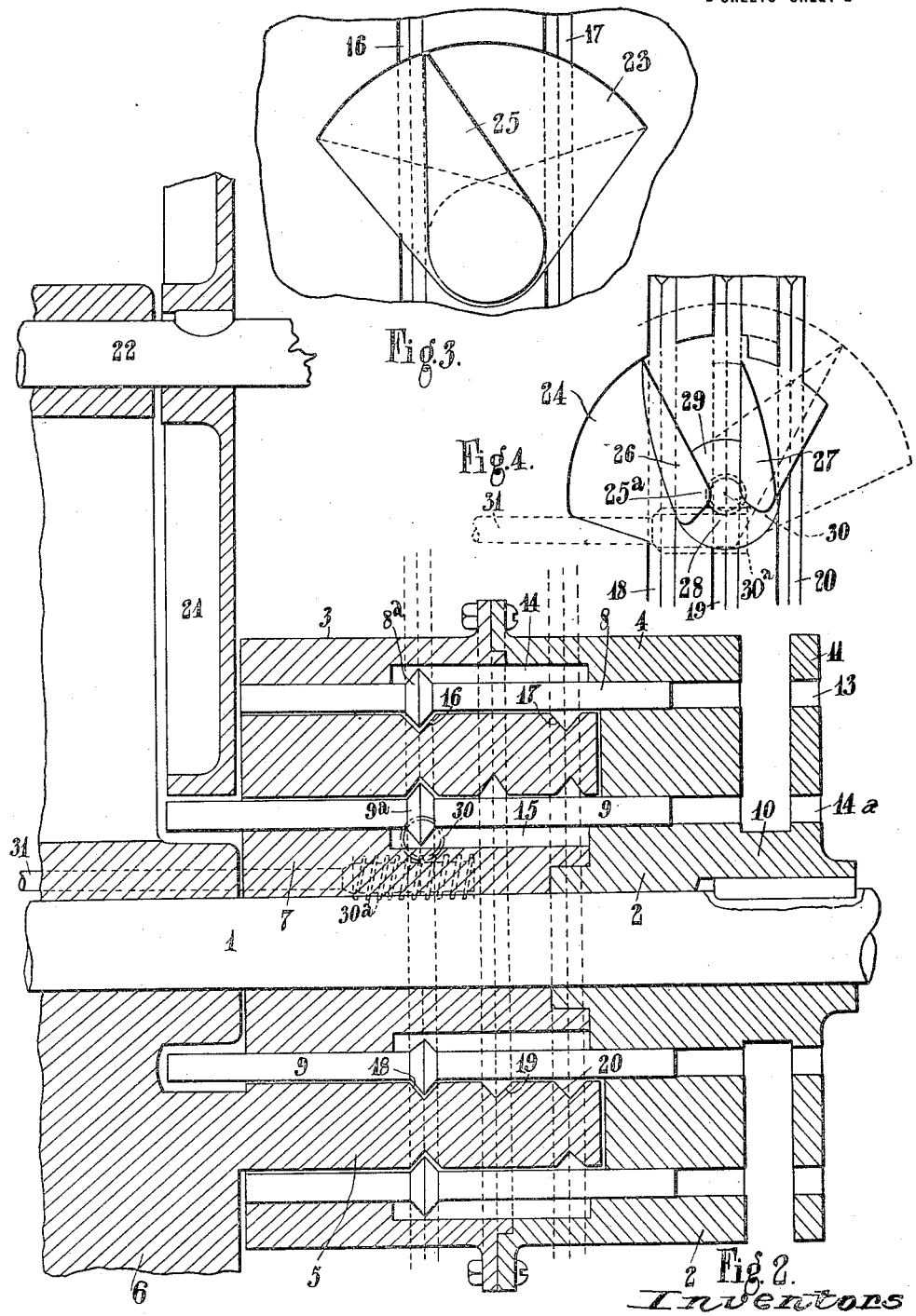

Patented Sept. 12, 1922.

1,428,999

UNITED STATES PATENT OFFICE.

JAMES WALLACE TYGARD AND ELIZABETH ANN TYGARD, OF LONDON, ENGLAND.

GRADUALLY VARIABLE POWER-TRANSMISSION GEAR OR DRIVE.

Application filed November 29, 1921. Serial No. 518,741.

*To all whom it may concern:*

Be it known that we, JAMES WALLACE TYGARD and ELIZABETH ANN TYGARD, both citizens of the United States of America, and both residing at Tygard House, 21 Old Gloucester Street, London, W. C. 1, England, have invented a certain new and useful Gradually Variable Power-Transmission Gear or Drive, of which the following is a specification.

This invention relates to power transmission gear of the type wherein the power is transmitted from a rotary element to a rotary element by means of a transmission or driving connection in the form of a chain or belt.

An object of the invention is to provide a variable gear or drive capable of transmitting power at two or more speeds, in which the change from one speed to another is effected gradually while the elements are rotating and without in any way interrupting the continuous transmission of power.

The invention comprises a driving or a driven unit provided with a plurality of transmission engaging members arranged around the axis of the unit or units and capable of displacement into and out of a position in which they may be engaged by the transmission connection as the rotation of the unit progresses, so that the transmission of power may be transferred from transmission engaging members situated on a circle of one radius to transmission engaging members situated on another circle at another radius or other circles of other radii.

The transmission engaging members may be displaceable in an axial or longitudinal direction, in which case a series of coaxial sets of elements are provided. Alternatively one or more coaxial sets of elements may be displaceable from one radius to another in a straight or curved path; or a combination of these two modes of displacement may be adopted.

The transmission engaging members are displaced during that part of the arc of rotation in which they are free from engagement with the transmission connection, and means are provided which are adapted to displace the elements during this period in their rotation.

The "transmission or driving connection" may be a frictional transmission connection such as a belt or it may be of chain form, according to the application of the invention. If the connection be of chain form it may be a sprocket chain or a chain of the inverted tooth type generally known as a silent chain; or the chain may be of any other form adapted positively to engage driving or driven elements.

For the purpose of driving or transmitting power in a reverse direction to that for which the gear is normally designed, the driving and the driven units or elements are combined with spur or like positive gears, or if the gear be designed for belt transmission the elements may be combined with pulleys and a crossed belt employed.

Hereinafter the transmission engaging member may be referred to for brevity as the "transmission member" or, in certain cases, by the term "member."

When the invention is applied to either the driving or the driven element alone, a jockey pulley or roller may be employed in connection with the belt or chain in order to take or give up the slack as occasion arises when the speed of transmission is varied.

For the purpose of indicating one's suitable way in which the invention may be carried into effect, a unit which may be employed either as a driven or a driving unit will now be described, but for convenience the unit will be considered from the point of view of a driving unit.

In the accompanying drawings:—

Figure 2 is a diagrammatic sectional plan of a driving or driven unit which, for the purpose of description, will be referred to as "a driving unit," the driven unit in this figure being omitted, a pinion alone being shown for effecting the reverse drive.

Figure 3 is a diagrammatic developed plan of a switch device for use in association with the outer set of transmission engaging members shown in Figures 1 and 2, while Figure 4 is a similar view of a switch device for use in association with the inner set of transmission engaging members shown in Figures 2 and 3.

Figure 1:
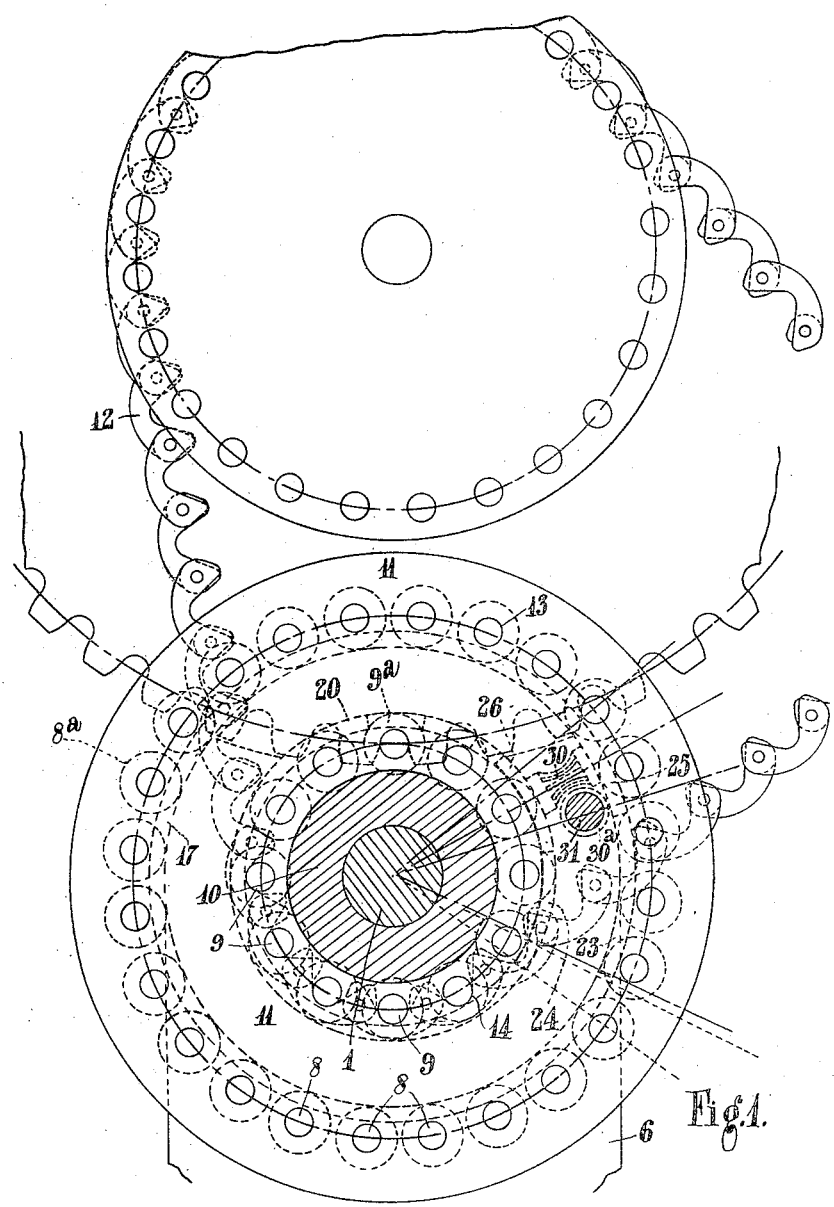
Figure 1 is a diagrammatic elevation illustrating transmission units according to one form of the invention. The right-hand unit in this figure is shown with a fixed set of transmission engaging members but it is to be understood that both elements may, if desired, be provided with movable transmission engaging members.

In carrying the invention into effect according to one convenient mode, as applied to a driving unit adapted to provide a high and low speed ratio, a reverse drive and a neutral or coasting position, a central or main driving shaft 1 has keyed upon it a cylindrical casing or housing 2 preferably divided into two parts 3 and 4. The casing has a central cavity in which is located an annular element 5 carried by a stationary frame or base 6. Within the annular element 5 a hub member 7 is secured to the casing 2 or keyed upon the shaft 1.

For this driving unit two coaxial sets or series of transmission engaging members are provided. An outer set 8 is mounted within the part 4 of the casing 2 and between the part 3 of the casing and the annular element 5. The inner set or series of transmission engaging elements 9 is similarly mounted in the part 4 of the casing and between the annular element 5 and the hub member 7.

Each of the transmission engaging elements comprises a steel rod 8, 9, of circular cross-section, having a wheel or runner 8a or 9a preferably of the shape indicated. The cylindrical parts of the rods 8 and 9 are supported in and guided by holes in the part 4 of the casing 2 on the one hand and on the other in semicircular slots formed in the part 3 of the casing 2 and the hub member 7 respectively.

The casing 2 is provided with a chain, hub or plane cylindrical portion 10 extending axially from it. This hub 10 is formed with an outer flange or disc 11. The clearance between the outer wall of the casing 2 and the inner wall of the flange or disc 11 is such as to accommodate a transmission connection in the form of a chain 12. Two concentric sets of holes 13 and 14a are provided, each hole of which is arranged coaxially with its corresponding transmission rod of the sets 8 and 9 and these holes are adapted to accommodate and support the ends of the rods when the latter are in their outer position, as will be presently described.

The parts 3 and 4 of the casing 2 and the hub 7 are recessed to form races 14 and 15 for the travel of the wheels or runners 8a and 9a respectively.

The fixed annular element 5 upon its outer periphery is formed with two tracks or grooves 16 and 17 of V shape or a cross-section corresponding with that of the runners. When the runners 8a are moving in the track 16 the transmission rods 8 are in the idle position and when the runners are travelling in the track 17 the rods are in the protruded position with their ends engaged and supported in the holes 13 in the flange or disc 11.

On the inner peripheral surface of the annular member 5 three tracks 18, 19 and 20 for the runners 9a are formed. The track 18 is in the same plane as the track 16 and corresponds with the "reverse" position of the set of rods 9, so far as the chain is concerned, and is in an idle position. When the runners 9a are in the track 18 their ends remote from the chain are protruded from the casing to engage the pinion 21 for transmitting a reverse drive to the driven shaft 22 upon which the pinion 21 is keyed. The track 20 is in the same plane as the track 17 and corresponds with the position of the rods 9 when they are in their outer or protruded position, and extend across the plane of the chain with their ends engaged in the holes 14 in the disc 11. The track 19 is located intermediate the tracks 16 and 17 and affords a second idle position for the rods 9 with respect to the chain 12.

The tracks 16 and 17 are interrupted by a recessed portion such as 23, the surface of which is a part of a cylinder having the same axis as the shaft 1. This surface coincides with and forms an extension of the lowest point of each of the grooves 16 and 17 so that the runners in their travel from the part of tracks 16, 17 upon one side of this portion 23 to the tracks on the other side pass across the cylindrical surface 23.

A similar interruption 24 (Figure 4) is provided in connection with the three tracks 18, 19 and 20, and in both of these interrupted portions 23 and 24 a switch is located which is adapted to transfer, at appropriate times, the runners of the transmission engaging elements from one track to another in order to cause the appropriate axial movement of such elements required to effect the change of gear desired. The interrupted portions 23 and 24 and their switch devices are located in the arc of the circumference of the unit which is free of the arcuate lap of the chain.

The switch for the runners 8a is shown in Figure 3 at 25 and this switch is adapted either to transfer the runners 8a from the track 16 to the track 17 or from the track 17 to the track 16.

The switch 25a for the runners 9a employed in connection with the tracks 18, 19 and 20 comprises two parts or elements 26 and 27 mounted upon a boss or head 28 which is flush with the surface 24. The parts 26 and 27 are mounted so that a space 29 is left between them for the passage of the runners 9ᵃ when moving into or travelling in the track 19.

The switch 25ᵃ may be placed in a position to cause the runners to be passed from one track to another, according to the position of gear desired, as will be hereinafter described.

The two switches 25 and 25ᵃ are mounted upon the opposite ends of the same spindle having suitable bearings in the annulus 5. The center of this spindle is preferably provided with a worm-wheel 30 adapted to be engaged by a worm such as 30ᵃ mounted on the end of a rod 31 which is operable from the outside. By rotating the rod 31 the position of the switches on the runners 8ᵃ and 9ᵃ may be altered at will.

It will be observed from the foregoing description that as the driving shaft 1 rotates (counter-clockwise according to Figure 1) the casing 2 with its parts 3 and 4—and the hub member 7 rotate en bloc carrying with them the two sets of transmission rods 8 and 9, so that the latter have a planetary movement around the axis of the shaft 1, travelling in one track or another, according to the position of the switches.

When a change of the nature of the gear ratio is to be performed the particular switch element or switch elements is or are introduced across the particular track or tracks in question. The point of a switch operates first by moving a transmission rod free of the chain over to one side slightly by bearing against its runner. This slight lateral movement affords sufficient margin for the introduction of the extremity of the switch element across the track of the oncoming runners. The switch operates as a facing point and causes each runner in succession to follow an inclined path. The runner bears against and slides upon the operative face of the switch. This movement causes the transmission rods to move or slide in succession axially so that their outer ends occupy the position required according to the change of condition to be effected.

To take an example, assuming it be desired to change from the "reverse" as shown in Figure 2 to low gear position. The rod 31 is operated so that the switches are rotated upon their axes. The switch point 26 is introduced across the track 18 with the result that each runner in succession will engage the inner face of the switch and be guided through the gap 29 into the track 19. This causes the set of rods 9 to be moved into a position in which their extremities towards the disc 11 lie just within the wall of the casing.

The switch is then moved over so that the element 27 cuts the circle of travel of the runners 9ᵃ in the track 19 in succession transferring them to the track 20 in which the ends of the set or rods 9 lie in the plane of the chain between the disc 11 and the end of the casing 2. In this position it will be seen that the element 26 will occupy a position still further to the left in Figure 4 but as there are no runners travelling in the track 18 this is of no consequence. Moreover, the corresponding movement of the switch 25 will be idle as the runners 8ᵃ are still travelling in the track 16.

To take another example, supposing it is desired to change from the low to high speed ratio, the rod 31 is operated to move the switch 25 over into a position in which it cuts the track 16. The runners 8ᵃ will in succession travel into the track 17 in which position the ends of the rods lie under the chain. As this axial movement of the rod is progressive the chain is picked up and lifted from off the rods 9 as the revolution of the unit progresses.

In moving the switch 25ᵃ as the switch 25 is moved into the position above indicated, the switch elements 26 and 27 are thrust still further into an extreme position to the left, both switch elements 26 and 27 lying across the tracks 18 and 19 but as these tracks are free of runners the movement is without effect as is, of course, required.

Assuming, now, that it is desired to change gear from the high gear to a neutral or coasting position, the switch 25 is moved over to cut the track 17 and subsequently moved still further over to the right until the switch element 27 cuts the track 20. By this operation it will be seen that first the track 17 is cleared of runners which are transferred to the track 16 and secondly the runners of the track 20 are transferred to the track 19. In these positions both sets of rods 8 and 9 are housed within the casing and the chain runs idly over the cylindrical surface of the hub 10.

From the idle position, the "reverse" position is gained by continuing the movement of the switches to the right so that the switch member 26 cuts the track 19, thereby causing the runners 9ᵃ which are revolving therein to be guided into the track 18 in which position the ends opposite the chain of the rods 9 are protruded into a position in which they mesh with the gear 21, as shown in Figure 2.

Having now described our invention what we claim as new and desire to secure by Letters Patent is:—

1. A variable power transmission gear comprising a rotary element, a plurality of concentric sets of transmission engaging members arranged around the axis of the rotary element, the engaging members of the several sets being capable of displacement into and out of a position in which they may be engaged by a transmission connection as the rotation of the element progresses so that the transmission of power may be transferred from a set of transmission engaging members situated on a circle of one radius to a set of transmission engaging gaging members situated on another circle or another radius.

2. A variable power transmission gear comprising a rotary element, a plurality of concentric sets of transmission engaging members arranged around the axis of the rotary element, the engaging members of the several sets being capable of axial displacement into and out of a position in which they may be engaged by a transmission connection as the rotation of the element progresses whereby the transmission of power may be transferred from a set of transmission engaging members situated on one circle of one radius to a set of transmission engaging members situated on another circle or another radius.

3. A variable power transmission gear comprising a rotary element, movable transmission engaging members arranged in a plurality of series of coaxial sets, and means coacting with said transmission engaging members of the several sets whereby the transmission of power may be transferred from a set of transmission engaging members situated on a circle of one radius to a set of transmission engaging members situated on a circle of another radius.

4. A variable power transmission gear comprising a rotatable element, a plurality of annular sets of planetary transmission engaging members, the engaging members of each set being capable of axial displacement in succession into and out of a position in which they may be engaged by a transmission connection as the rotation of the unit progresses, and means for effecting displacement of the transmission engaging members at a time when they are disengaged from the transmission connection.

5. A variable power transmission gear comprising a rotary element, a plurality of planetary transmission engaging members capable of axial movement into and out of operative relation to a transmission connection, a switching device associated with the transmission engaging members, and means on said transmission engaging members located intermediate the ends thereof and engageable by said switching device whereby said members are moved axially from one position to another.

6. A variable power transmission gear comprising a rotary element and a plurality of sets of planetary transmission engaging members movable axially into and out of operative relation to a transmission connection during the rotation of said element, circular tracks having portions thereof interrupted, projections on said transmission engaging members adapted to travel in said tracks, and switching devices located in the interrupted portions of the tracks arranged to cooperate with the projections on the transmission engaging members of the respective sets whereby to successively transfer the latter from one track to another.

7. A variable power transmission gear comprising a rotary element, a plurality of planetary transmission engaging members mounted for axial displacement and arranged in a series of coaxial sets, said transmission engaging members being adapted for engagement with a transmission connection, and means for displacing the sets of said transmission engaging members, the displacing means from the several sets of transmission engaging members being connected together so that as the displacing members associated with one set causes the transmission connection to engage transmission members of this set at a greater radius, the displacing means associated with the other set causes the transmission connection to engage transmission members of that set at a correspondingly less radius.

8. A variable power transmission gear comprising a rotary element, a plurality of transmission engaging members mounted for axial displacement in succession into and out of position for engaging a transmission connection, and a gear engageable by certain of the transmission members to effect a reverse drive.

9. A variable power transmission gear comprising a rotary element, a plurality of circular sets of transmission engaging members each movably mounted in the rotary element, the respective sets of transmission members being selectively engageable with transmission connections and the several sets of transmission members being of different length.

10. A variable power transmission gear comprising a plurality of transmission engaging members mounted for displacement into and out of position for engaging a transmission connection, a support for said members, and a plain surface member carried by the support and arranged in the plane of the transmission connection whereby, when the transmission engaging members are displaced out of the plane of the transmission connection, a neutral state of the gear is provided.

11. A variable power transmission gear comprising a rotary element, a plurality of sets of transmission engaging members, the several sets of transmission engaging members being concentrically spaced and arranged about the axis of the rotary element, and means operable to project either set of engaging members into transmission connection engaging position and to simultaneously retract the engaging members of the several sets whereby to disengage said members from the transmission connection.

12. A variable power transmission gear comprising a rotary element, a plurality of sets of planetary transmission engaging members, the several sets of engaging members being concentrically spaced and arranged about the axis of the rotary element and being capable of movement into and out of operative relation to a transmission connection during rotation of said element, circular tracks having portions thereof interrupted, projections on said engaging members adapted to travel in said tracks, switching devices arranged in the interrupted portions of the track arranged to engage with the projections on the transmission engaging members of the respective sets whereby to successively transfer the latter from one track to another, and a pivotal support common to the several switching devices whereby the latter are simultaneously actuated.

13. A variable power transmission gear comprising a rotary element, a plurality of sets of planetary transmission engaging members, the several sets of engaging members being concentrically spaced and arranged about the axis of the rotary element and being capable of movement into and out of operative relation to a transmission connection during rotation of said element, circular tracks having portions thereof interrupted, projections on said engaging members adapted to travel in said tracks, switching devices arranged in the interrupted portions of the track arranged to engage with the projections on the transmission engaging members of the respective sets whereby to successively transfer the latter from one track to another, a pivotal support common to the several switching devices whereby the latter are simultaneously actuated, and means for adjusting said supporting means for varying the position of the switching devices.

In testimony whereof we have signed our names to this specification.

JAMES WALLACE TYGARD.
ELIZABETH ANN TYGARD.